Oct. 2, 1928.
S. M. HERSHBERG
1,686,211
ROLL FILM CONTROL
Filed June 10, 1926
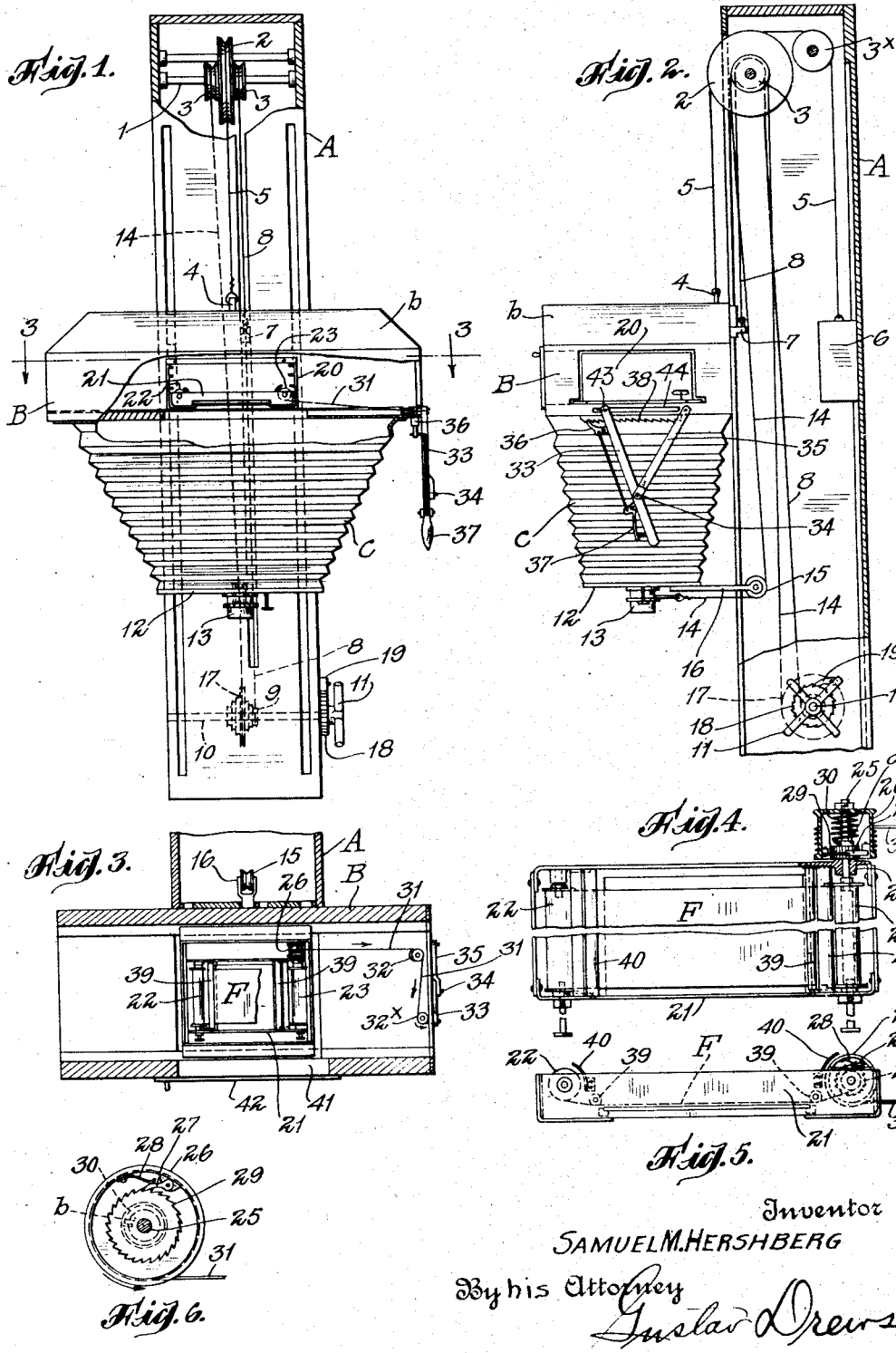
Inventor
SAMUEL M. HERSHBERG
By his Attorney
Gustav Drews Patented Oct. 2, 1928.

1,686,211

UNITED STATES PATENT OFFICE.

SAMUEL M. HERSHBERG, OF BROOKLYN, NEW YORK.

ROLL-FILM CONTROL.

Application filed June 10, 1926. Serial No. 114,930.

The object of the present invention is to provide a camera adapted for photographic reproduction work, and particularly of that type in which the camera box supports a negative holder below a lamp and the negative image is projected through a lens and upon a sensitized sheet for printing thereon. The invention relates more particularly to means for controlling a film bearing a plurality of negatives and for supporting and actuating the film to bring the negatives successively into register with the lens by means operable from a point exterior of the camera box.

The invention will be understood by reference to the accompanying drawings—

Figure 1 is a front elevation, partly in section, of a device constructed in accordance with the invention;

Figure 2 is a side elevation of the said device, certain elements being shown in section;

Figure 3 is a horizontal section on the line 3—3, Figure 1, looking in the direction of the arrows;

Figure 4 is an enlarged plan view, partly in section of the negative holder;

Figure 5 is a side elevation of the same;

Figure 6 is an enlarged side elevation of the ratchet and pawl device for actuating the take-up spool of the negative holder.

The embodiment of the invention illustrated in the drawings comprises a camera supporting unit A and the camera assembly B. The camera is adjustable bodily toward and from the sensitized sheet upon which the negative image is to be projected and printed, and the means for this purpose is carried by and operable from the supporting unit A. At the top of supporting unit A is a shaft 1 carrying a large pulley 2 and the small pulleys 3. Attached at 4 to the lamp-housing *b* of the camera assembly is a cable 5 which is led over pulley 2, thence over a small pulley 3ˣ and is connected to a counter-balance weight 6. The lamp-housing *b* is provided with a rearwardly projecting lug 7 to which is connected a cable 8, the cable being led over one of the small pulleys 3 and thence extends downward to a small drum 9 on a shaft 10, the latter being rotatable through hand wheel 11. Depending from the camera box is a bellows *c* supporting a lens frame 12 which carries the lens housing 13. To lens housing 13 is connected a cable 14 led over a pulley 15 and bracket arm 16, the cable extending upwardly and over one of the small pulleys 3 and thence being led downwardly to a relatively large drum 17 on shaft 10.

Drums 9 and 17 have spirally formed surfaces, that is to say the path of travel of the cable as it is wound upon either drum changes in diameter, the arrangement being such that the bellows and camera may be lowered simultaneously, but the bellows has a greater speed, and hence a greater degree of movement than the camera casing. The said mechanism forms part of the subject of a co-pending application Serial No. 114,-928, filed June 10, 1926, and is not specifically claimed here. In order to maintain adjustment, a tooth wheel 18 is carried by shaft 10 exteriorly of supporting unit A and a pawl 19 is carried by the unit and engages the teeth of the wheel.

Within the camera casing and in register with the lens is a negative rack 20 adapted to receive a negative holder 21. Negative holder 21 is provided with any suitable means for removably supporting the supply spool 22 and the take-up spool 23. Rotatable within a boss 24 of the negative holder is the flattened end of a shaft 25 which is adapted to fit within a slot in one end of the negative spool 23 in accordance with the customary practice. Freely rotatable upon shaft 25 is a drum 26, drum 26 being provided with a pawl 27 which is lightly pressed by spring 28 into contact with the teeth of a ratchet wheel 29, the wheel being fixed to the shaft. A spiral spring 30 is disposed within drum 26, one end of the spring being connected to the drum and the other end to a member *d*.

Wound upon drum 26 is a cable 31 which is led over guide pulleys 32, 32ˣ and thence is connected to the end of a lever 33 fulcrumed at 34 upon an arm 35. Lever 33 is adapted to be held in any position to which it is moved by pawl 36 which may be released by the hand operated device 37, the pawl engaging a ratchet 38. A slot 44 formed in the camera casing B cooperates with the pin 43 formed at the upper end of the lever 33 to form a limiting guide for the movement of the lever 33.

Referring to Figure 2 it will be noted that when lever 33 is swung on its fulcrum 34 so as to carry its lower end to the right, cable 31 will be pulled out to rotate drum 26 and wind in a film F onto spool 23 from the supply spool 22. In its movements the film is guided by the small rollers 39, and shields 40 are carried by the negative holder adjacent the spools to further aid in maintaining the proper position of the film.

It will be noted that the negative rack 20 has several divisions and is adapted to support vignettes, etc. in one division and a plate or other form of negative in a preceding division. The camera box in the front of the negative rack is formed with an opening 41 for access to the film rack, the opening being normally closed by cover plate 42.

It will be understood that the length of movement imparted to the film F will be proportionate to the length of travel of the cable 31. This length of travel will be controlled by the operative length of movement of the lever 33, which movement will be increased with the length of the individual negatives on the film F.

Having described my invention, it will be understood that various modifications may be made in the embodiment illustrated in the drawings, what I claim and desire to secure by Letters Patent being as follows:—

1. In a camera, a casing, a bellows depending from the casing, a lens carried by the bellows, means for simultaneously adjusting the position of the lens and casing, a negative rack within the casing, a negative holder held in said rack and adapted to support a supply and a take-up spool for a negative film, means operable exteriorly of the casing for imparting successive movements to the take-up spool, and a guide forming a predetermined limit of movement for said latter means, said predetermined limit of movement corresponding to the length of negative to be exposed so that successive lengths of negative may be actuated into exposed position by the actuation of said latter means.

2. In a camera of the character described, a camera casing, a negative holder in said casing comprising supporting means for a supply spool and a take-up spool, said means including a rotatable shaft, a ratchet wheel on the shaft, a drum rotatable about the shaft and having a pawl connecting the ratchet wheel, a cable wound about the drum, means exterior of the camera casing for imparting successive movements to the cable, and a guide forming a predetermined limit of movement for said latter means, said predetermined limit of movement corresponding to the length of negative to be exposed so that successive lengths of negative may be actuated into exposed position by the actuation of said latter means.

3. A camera comprising a casing, a bellows, a lens carried by the bellows, and means for simultaneously adjusting the positions of the casing and lens, a negative rack in the casing, and a negative holder comprising supporting means for a supply and a take-up spool, said means including a shaft, a rotatable drum, means intermediate the drum and shaft for rotating the latter upon rotation of the drum in a given direction, a spring for returning the drum to initial position after an operative movement, a cable for rotating the drum, and a guide forming a predetermined limit of movement for said cable, said predetermined limit of movement corresponding to the lengths of negative to be exposed so that successive lengths of negative may be actuated into exposed position by the actuation of said cable.

4. A negative holder comprising a frame formed with parallel side flanges, means carried by said flanges for supporting supply and take-up spools, said means including a rotatable shaft for the take-up spool, a drum surrounding the shaft, means intermediate the drum and the shaft for rotating the latter upon movement of the drum in a given direction, a spring within the drum for moving it to initial position after an operative movement, a lever, a cable on the drum for rotating the latter and connected to said lever, a guide forming a predetermined limit of movement for said lever, said predetermined limit of movement corresponding to the length of negative to be exposed so that successive lengths of negative may be actuated into exposed position by the actuation of said lever, a ratchet, and a pawl associated with said lever and cooperating with said ratchet to facilitate anchoring the lever upon the completion of partial movements of said lever.

5. In a device of the character described, a camera casing and a negative holder disposed in said casing, said holder provided with means for supporting a supply spool and a take-up spool, a rotatable member for actuating the take-up spool, said member having operative and inoperative movements, a spring for effecting the inoperative movement of said rotatable member, a cable for effecting the operative movement of the rotatable member, a lever exteriorly of the camera casing for imparting successive movements to the cable, a guide forming a predetermined limit of movement for said lever, said predetermined limit of movement corresponding to the length of negative to be exposed so that successive lengths of negative may be actuated into exposed position by the actuation of said lever, a ratchet, and a pawl associated with said lever and cooperating with said ratchet to facilitate anchoring the lever upon the completion of partial movements of said lever.

SAMUEL M. HERSHBERG.